US007966026B2

(12) United States Patent
Zellner et al.

(10) Patent No.: US 7,966,026 B2
(45) Date of Patent: *Jun. 21, 2011

(54) METHOD AND SYSTEM FOR DELIVERY OF A CALLING PARTY'S LOCATION

(75) Inventors: Samuel N. Zellner, Dunwoody, GA (US); Robert T. Moton, Jr., Alpharetta, GA (US); Mark J. Enzmann, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,278

(22) Filed: Jul. 30, 2010

(65) Prior Publication Data
US 2010/0296510 A1 Nov. 25, 2010

Related U.S. Application Data

(63) Continuation of application No. 09/630,134, filed on Aug. 1, 2000, now Pat. No. 7,796,998.

(51) Int. Cl.
*H04W 24/00* (2009.01)
(52) U.S. Cl. ............... 455/457; 455/456.1; 455/433; 455/414.1; 455/415; 455/404.1; 379/201.04; 379/201.08; 379/207.12; 370/352; 370/356
(58) Field of Classification Search ............... 455/456.1, 455/457, 404.1, 404.2; 370/352–356, 401
See application file for complete search history.

(56) References Cited

U.S. PATENT DOCUMENTS

| | | | |
|---|---|---|---|
| 4,757,267 | A | 7/1988 | Riskin |
| 5,303,393 | A | 4/1994 | Noreen et al. |
| 5,444,444 | A | 8/1995 | Ross |
| 5,511,111 | A | 4/1996 | Serbetcioglu et al. |
| 5,512,908 | A | 4/1996 | Herrick |
| 5,566,235 | A | 10/1996 | Hetz |
| 5,588,042 | A | 12/1996 | Comer |
| 5,596,625 | A | 1/1997 | LeBlanc |
| 5,610,973 | A | 3/1997 | Comer |
| 5,625,364 | A | 4/1997 | Herrick et al. |
| 5,657,375 | A | 8/1997 | Connolly et al. |
| 5,663,734 | A | 9/1997 | Krasner |
| 5,696,815 | A * | 12/1997 | Smyk ................... 379/142.16 |
| 5,701,301 | A | 12/1997 | Weisser, Jr. |
| 5,721,899 | A | 2/1998 | Namba |

(Continued)

FOREIGN PATENT DOCUMENTS

WO WO9819484 A2 5/1998

(Continued)

*Primary Examiner* — Sharad Rampuria
(74) *Attorney, Agent, or Firm* — Cantor Colburn LLP

(57) ABSTRACT

A method and system for providing a service that delivers location information associated with a caller. The service operates in both wireline and wireless networks, providing called parties with the location information of calling parties who use either stationary terminal devices or mobile devices. The service can operate as a stand alone service or can be a part of a calling name delivery service (or caller-ID service), delivering location information in addition to the conventional name, number, date, and time. The components of the present invention include a service control point, an address database in communication with the service control point, and a network that tracks the locations of mobile network users. The system further includes a mapping converter if the location data provided by the network is not meaningful to a subscriber.

20 Claims, 6 Drawing Sheets

U.S. PATENT DOCUMENTS

| | | | |
|---|---|---|---|
| 5,727,057 | A | 3/1998 | Emery et al. |
| 5,771,283 | A | 6/1998 | Chang et al. |
| 5,819,155 | A | 10/1998 | Worthy et al. |
| 5,825,775 | A | 10/1998 | Chin et al. |
| 5,838,774 | A | 11/1998 | Weisser, Jr. |
| 5,848,131 | A * | 12/1998 | Shaffer et al. ............. 379/88.2 |
| 5,852,775 | A | 12/1998 | Hidary |
| 5,875,401 | A | 2/1999 | Rochkind |
| 5,903,636 | A | 5/1999 | Malik |
| 5,949,865 | A * | 9/1999 | Fusinato ............. 379/221.09 |
| 5,949,867 | A | 9/1999 | Sonnenberg |
| 5,961,593 | A | 10/1999 | Gabber et al. |
| 6,011,975 | A | 1/2000 | Emery et al. |
| 6,021,126 | A * | 2/2000 | White et al. ............. 370/352 |
| 6,028,921 | A | 2/2000 | Malik et al. |
| 6,085,086 | A | 7/2000 | La Porta et al. |
| 6,101,381 | A | 8/2000 | Tajima et al. |
| 6,138,003 | A | 10/2000 | Kingdon et al. |
| 6,157,829 | A | 12/2000 | Grube et al. |
| 6,183,003 | B1 | 2/2001 | Matsuhashi et al. |
| 6,185,426 | B1 | 2/2001 | Alperovich et al. |
| 6,208,854 | B1 | 3/2001 | Roberts et al. |
| 6,233,329 | B1 | 5/2001 | Urban et al. |
| 6,249,577 | B1 * | 6/2001 | Baldwin ............. 379/221.09 |
| 6,259,405 | B1 | 7/2001 | Stewart et al. |
| 6,311,069 | B1 | 10/2001 | Havinis et al. |
| 6,324,349 | B2 | 11/2001 | Nakano et al. |
| 6,324,396 | B1 | 11/2001 | Vasa et al. |
| 6,353,664 | B1 | 3/2002 | Cannon et al. |
| 6,404,876 | B1 * | 6/2002 | Smith et al. ............. 379/218.01 |
| 6,418,308 | B1 | 7/2002 | Heinonen et al. |
| 6,421,411 | B1 | 7/2002 | Hsieh |
| 6,449,497 | B1 | 9/2002 | Kirbas et al. |
| 6,473,626 | B1 | 10/2002 | Nevoux et al. |
| 6,484,148 | B1 | 11/2002 | Boyd |
| 6,505,046 | B1 | 1/2003 | Baker |
| 6,505,049 | B1 | 1/2003 | Dorenbosch |
| 6,505,163 | B1 | 1/2003 | Zhang et al. |
| 6,516,203 | B1 * | 2/2003 | Enzmann et al. ............. 455/556.1 |
| 6,590,885 | B1 | 7/2003 | Jorgensen |
| 6,614,718 | B2 | 9/2003 | Cecconi et al. |
| 6,618,593 | B1 | 9/2003 | Drutman et al. |
| 6,622,016 | B1 | 9/2003 | Sladek et al. |
| 6,647,257 | B2 | 11/2003 | Owensby |
| 6,662,014 | B1 | 12/2003 | Walsh |
| 6,701,160 | B1 | 3/2004 | Pinder et al. |
| 6,716,101 | B1 | 4/2004 | Meadows et al. |
| 6,779,020 | B1 | 8/2004 | Henrick |
| 6,819,929 | B2 | 11/2004 | Antonucci et al. |
| 6,850,758 | B1 | 2/2005 | Paul et al. |
| 6,874,011 | B1 | 3/2005 | Spielman et al. |
| 6,882,641 | B1 * | 4/2005 | Gallick et al. ............. 370/356 |
| 6,937,869 | B1 | 8/2005 | Rayburn |
| 6,940,950 | B2 | 9/2005 | Dickinson et al. |
| 6,954,526 | B1 * | 10/2005 | Glenn et al. ............. 379/220.01 |
| 6,963,557 | B2 * | 11/2005 | Knox ............. 370/352 |
| 6,996,211 | B2 | 2/2006 | Reynolds et al. |
| 7,079,627 | B2 | 7/2006 | Crago et al. |
| 7,103,368 | B2 | 9/2006 | Teshima |
| 7,106,843 | B1 | 9/2006 | Gainsboro et al. |
| 7,123,693 | B2 | 10/2006 | Nelson et al. |
| 7,181,225 | B1 | 2/2007 | Moton, Jr. et al. |
| 7,212,829 | B1 | 5/2007 | Lau et al. |
| 7,260,186 | B2 | 8/2007 | Zhu et al. |
| 7,260,378 | B2 | 8/2007 | Holland et al. |
| 7,330,464 | B2 | 2/2008 | Brouwer et al. |
| 7,529,359 | B2 | 5/2009 | Gallant et al. |
| 7,796,998 | B1 * | 9/2010 | Zellner et al. ............. 455/456.1 |
| 2003/0109245 | A1 | 6/2003 | McCalmont et al. |
| 2006/0167986 | A1 | 7/2006 | Trzyna et al. |
| 2007/0047523 | A1 | 3/2007 | Jiang |

FOREIGN PATENT DOCUMENTS

| | | | |
|---|---|---|---|
| WO | WO9927716 | A1 | 6/1999 |

* cited by examiner

METHOD AND SYSTEM FOR DELIVERY OF A CALLING PARTY'S LOCATION

CROSS-REFERENCE TO RELATED APPLICATIONS

This is a continuation application of U.S. Non-provisional application Ser. No. 09/630,134 entitled METHOD AND SYSTEM FOR DELIVERY OF A CALLING PARTY'S LOCATION filed Aug. 1, 2000, the contents of which are herein incorporated by reference.

BACKGROUND

The present invention relates to telecommunication systems, and in particular, to caller name delivery services and networks that track the location and identity of network devices.

The benefits of calling name delivery (CNAM), also known as caller identification or caller ID. CNAM enables a called party to view information about a calling party on a display unit, which is typically a liquid crystal display (LCD), a light-emitting diode (LED) display, or a comparable device. The displayed information generally includes at least the calling party's name, the calling party's directory number, and the date and time of the call.

PSTNs typically provide CNAM information (except for the date and time, which is generally provided by the display unit) using the model illustrated in FIG. 1, which is a prior art schematic of a CNAM system architecture implemented within an Advanced Intelligent Network (AIN). AIN networks use a complex, high speed, high traffic volume data packet-switched messaging system to provide versatility in the handling of telephone calls. The Advanced Intelligent Network System is described in U.S. Pat. No. 5,701,301 and U.S. Pat. No. 5,838,774, which are hereby incorporated by reference in their entirety.

Referring to FIG. 1, CNAM is typically implemented in the following manner. A calling party 101 picks up the telephone and dials the directory number of a called party 102, which is 404-555 2222. Called party 102 is a CNAM subscriber having a CNAM display unit 116. CNAM display unit 116 could be separate from or integral to the device of called party 102. After calling party 101 dials the directory number, an central office 104 (also referred to as a service switching point) serving calling party 101 obtains routing information and populates an initial address message (IAM) with certain information. The IAM is a parameter that exists within an integrated services digital network user part (ISUP) signaling message. The IAM is a defined message type from TR-NTW-000246 and ITU Q.764/Q.767, and is one of a sequence of messages used in ISUP trunk signaling. An ISUP signaling message employs a Common Circuit Signaling System 7 (CCS7) call setup protocol. In particular, the IAM is populated with the directory number of calling party (404 555-1111), the directory number of the called party (404-555-2222), and a presentation parameter. In this case, the presentation parameter allows a CNAM display.

Central office 104 then sends this routing information in the signaling message to a central office 106, which serves called party 102. Recognizing that the call is for a CNAM subscriber, central office 106 halts the calling process to launch a calling name query 150 on the CCS7 network. As a part of the query launch, central office 106 populates a called party address parameter in query 150 with the directory number of calling party 101, in this case 404-555-1111. The called party address parameter is a routing parameter within an Advanced Intelligence Network (MN) query package.

After central office 106 has populated the called party address parameter, calling name query 150 is sent to a signaling transfer point (STP) 108. STP 108 performs a global title translation (GTT) on the called party address parameter to determine to which service control point (SCP) calling name query 150 should be routed. This determination is made based on the first three digits (the numbering plan area, or NPA) in the directory number of calling party 101, which 2 in this case is 404. STP 108 then forwards the calling name query to the appropriate SCP 112 through CCS7 Network 110. SCP 112 searches a CNAM database 114 for calling party's record from which SCP 112 retrieves the associated name. CNAM database 114 is preferably a part of SCP 112, as shown in FIG. 1, but may be separate from SCP 112, or incorporated as part of another network element such as a service node or a switch.

SCP 112 returns the name associated with the directory number of calling party 101 in a transaction capability application part (TCAP) response 151 to central office 106 through CCS7 Network 110 and STP 108. TCAP response 151 is the final message containing instructions on how to handle the call. TCAP response 151 ends the SSP/SCP transaction that began with calling name query 150. In this example, the full name of calling party 101 is returned in TCAP response 151 to central office 106.

When central office 106 terminates the call to called party 102, central office 106 sends the name of calling party 101 and the directory number of calling party 101 (404-555-1111). Central office 106 sends this information over called party's line to called party's display unit 116. The information is then displayed on called party's display unit 116, along with the date and time of the call (generated by display unit 116).

The principal advantage of conventional CNAM services is the ability to screen calls. Upon receiving a call, a called party can review the information on the display unit and decide whether or not to answer the call. However, users wanting to screen calls and fulfill other location-sensitive purposes often prefer to know more about the calling party than just name, number, date, and time. For instance, a service dispatcher monitoring the activities of his service technician may wish to receive the exact location of his technician each time the technician calls in, so as to facilitate efficient scheduling of the next 3 assignment. Although the name and number on the CNAM display unit could possibly provide clues to the technician's location, the dispatcher would prefer seeing a more precise and easily understandable description of location, e.g., a street address or building name. Thus, although the typical CNAM information may be suitable for simple call screening, many telephone users would prefer to receive even more information about the calling party.

BRIEF SUMMARY

The present invention is a method and system for providing a service that delivers location information associated with a caller. The service operates in both wireline and wireless networks, providing called parties with the location information of calling parties who use either stationary or wireless telephones. The service can operate as a stand alone service or can be a part of a CNAM service, delivering location information in addition to the conventional name, number, date, and time. In conjunction with any call, the present invention reports to the called party, the location from which the calling party is calling. Therefore, a subscriber can use the valuable location information to better screen calls and to fulfill other location-sensitive purposes.

The primary components of the present invention include a service control point, an address database in communication with the service control point, and a network that tracks the locations of network users. The service control point operates within a PSTN in cooperation with other MN components, such as signal transfer points and service switching points. The address database operates within the location-tracking network and allows access by the service control point to its contents. The location-tracking network interfaces with the PSTN to terminate calls between location-tracking network users and PSTN users. For example, for a wireline network, central offices 4 provide this interface. As another example, for a wireless network, mobile switching centers (MSCs) provide this interface. As another example, for voice over Internet protocol (VoIP) calls, an Internet protocol network and an IP-to-PSTN gateway provide the interface.

The service control point performs service logic in response to a query requesting the location of a calling party. The service control point can also execute logic in response to a query for the caller name.

The service control point accesses the name database (for CNAM) and the address database (for location information delivery). In response to queries, the service control point also returns routing instructions to direct the service switching points how to terminate a call and to provide CNAM and location information for presenting on a display unit.

The address database cross-references location information with directory numbers, listing location information for every directory number. These directory numbers (commonly referred to as telephone numbers) correspond to stationary terminal devices (e.g., telephones connected to the wireline network) and to mobile devices (e.g., cellular telephones). For stationary terminal devices, the location-tracking network records each entry in the address database upon service activation and does not change the entry unless the terminal device is disconnected and/or moved. For mobile devices, the location-tracking network periodically updates entries in the address database, changing the location information as the mobile devices move from place to place.

The location-tracking network is a call carrier that tracks the locations of its users and maintains the information in the address database. For example, the location-tracking network could be a wireline network that records the location of stationary terminal devices upon service activation. As another example, the location tracking network could be a conventional wireless network providing such services as paging, digital cellular, and personal communications services (PCS). To track location of wireless network users, the wireless network would use, for example, handheld device location systems or network-based location systems. As another example, the location-tracking network could be an Internet protocol network, in which location could be an email address.

Together, in the context of a call, these components deliver the location of a calling party to a called party for presentation to the called party using such media as textual displays, graphical displays, and audio messages. The methods by which the locations are delivered vary depending on whether the calling party is using a stationary terminal device or a mobile device. Broadly stated, the method of the present invention for delivering a calling party's location in the context of a call from a stationary terminal device includes receiving the call at a service switching point, activating a trigger set for calls to a location delivery subscriber (the called party), sending a query to the service control point requesting location information, searching the address database for the calling party's directory number to determine the calling party's location, returning routing instructions and the calling party's location to the service switching point, routing the call to the called party, and displaying the calling party's location on the called party's display unit. Alternately, the method could also include searching a name database in communication with the service control point for the calling party's number to determine the calling party's name, returning the calling party's name, and displaying the calling party's name on the display unit.

In the context of a call from a mobile device, the method of the present invention generally includes determining the calling party's location using a location system of the location-tracking network, recording the calling party's location in the address database with an associated identifier (e.g., Mobile Identification Number, or MIN), forwarding the call to a service switching point of the PSTN, activating a trigger set for calls to a location delivery subscriber (the called party), sending a query to the service control point requesting location information, searching the address database for the calling party's directory number to determine the calling party's location, returning routing instructions and the calling party's location to the service switching point, routing the call to the called party, and displaying the calling party's location on the called party's display unit.

Preferably, the location system records the calling party's location in a way meaningful to the location delivery subscriber of the location information delivery service. For example, location information could include street addresses, landmarks, or building names. However, if the location system provides less descriptive location information, this method may also include the step of converting the location information provided by the location system into a more meaningful description or a description better suited for displaying on a display unit. For example, if the location system merely provides position coordinates, the service control point could use a mapping converter to translate the position coordinates received from the address database into a street address or building name for display on the display unit.

Alternatively, in addition to location delivery, the present invention could also include searching a name database in communication with the service control point for the calling party's identifier to determine the calling party's name, returning the calling 7 party's name, and displaying the calling party's name on the display unit.

Accordingly, it is an object of the present invention to provide a subscriber with the location of a calling party.

Another object of the present invention is to provide location delivery subscribers with easy to understand location descriptions.

Another object of the present invention is to provide a location delivery service for both wireline and wireless network users and for both stationary terminal devices and mobile devices.

These and other objects of the present invention are described in greater detail in the detailed description of the invention, the appended drawings, and the attached claims.

DETAILED DESCRIPTION OF EXEMPLARY EMBODIMENTS

The present invention is a location delivery service for called parties. The invention provides subscribing called parties with location information about calling parties, for both stationary terminal devices (e.g., wireline) and mobile devices (e.g., wireless). The location delivery service enables a subscriber to more effectively screen calls and to satisfy other location-sensitive purposes. The present invention contemplates future enhanced digital cellular networks that will track the identity and location of each wireless network user.

The system of the present invention provides location delivery using at least a service control point, an address database in communication with the service control point, and a network that tracks the locations of network devices. If the location-tracking network provides location information in a form unsuitable for display on a display unit, the system further includes a mapping converter in communication with the service control point. The method of the present invention varies according to whether a calling party is a stationary terminal device (e.g., wireline) or a mobile device (e.g., wireless). The system architecture of FIG. 2a and the corresponding flowchart of FIG. 2b illustrate the location delivery service for a wireline call from a stationary terminal device, according to a preferred embodiment of the present invention. The system architecture of FIG. 3a and the corresponding flowchart of FIG. 3b illustrate the location delivery service for a wireless call from a mobile 9 device, according to another preferred embodiment of the present invention.

Figure 1:
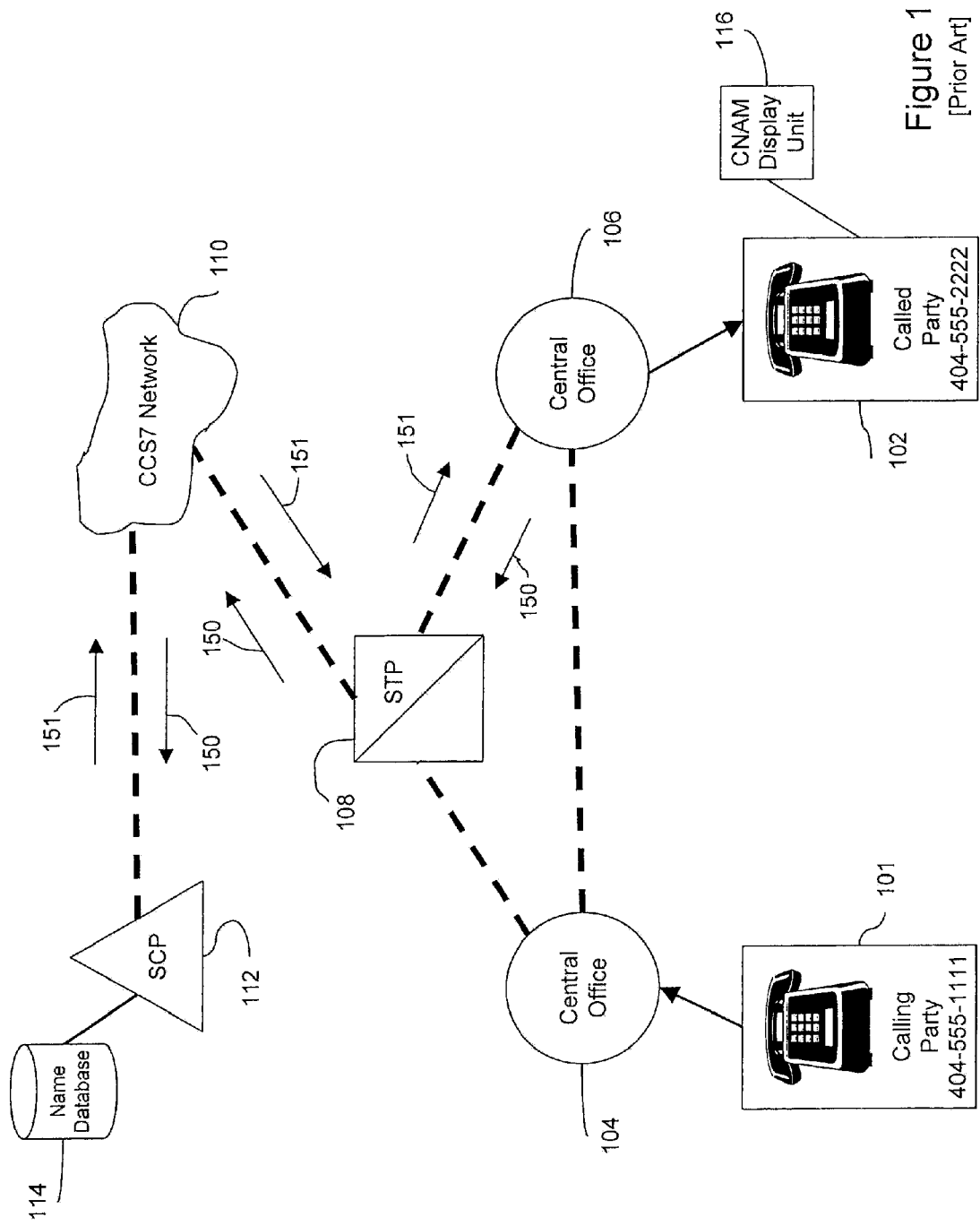
FIG. 1 is a prior art schematic diagram illustrating the CNAM operating environment.
Figure 2A:
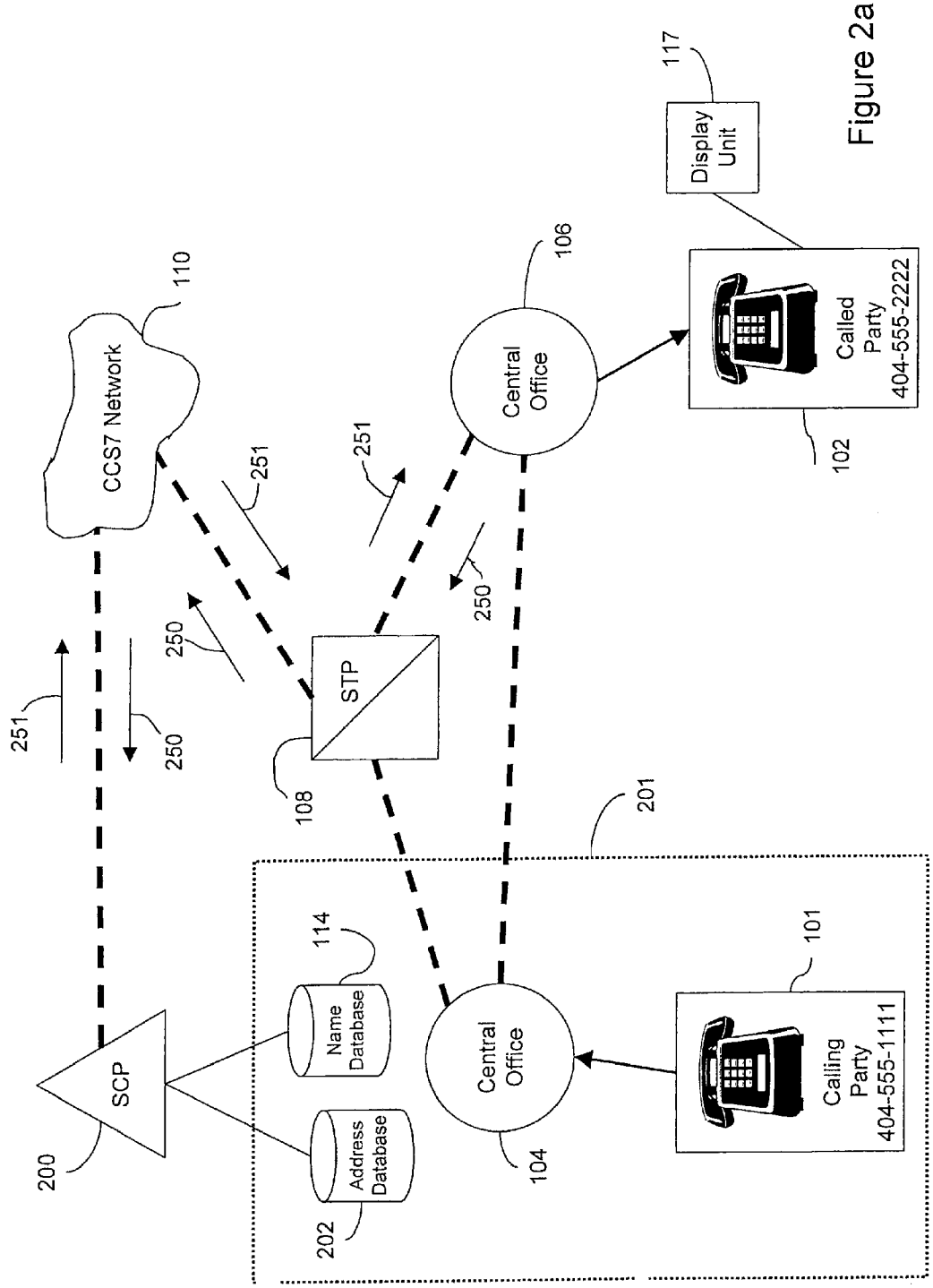
FIG. 2a is a schematic diagram of a system architecture that provides location delivery for calling parties using stationary terminal devices, according to a preferred embodiment of the present invention.
Figure 2B:
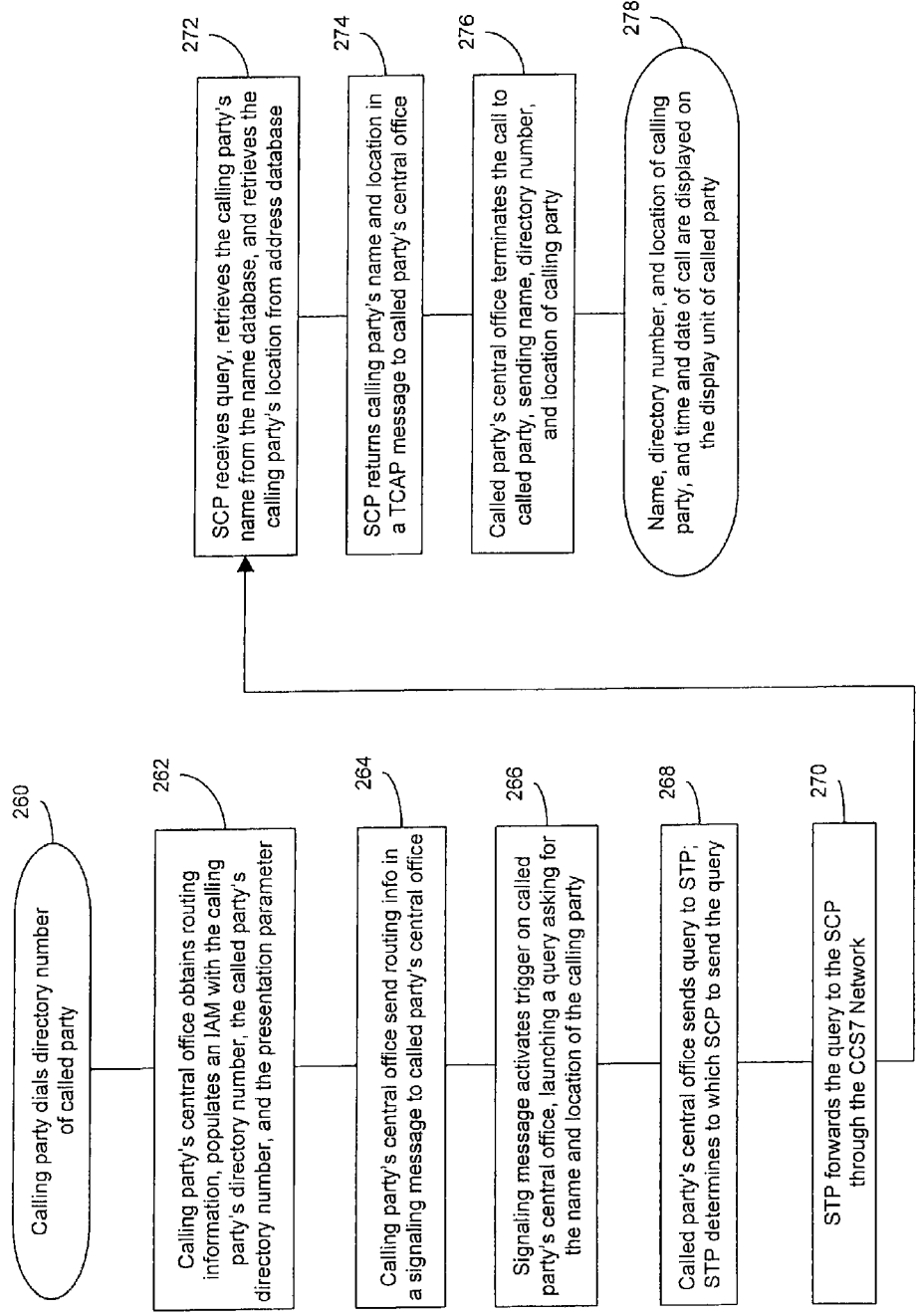
FIG. 2b is a flowchart, corresponding to FIG. 2a, outlining the method steps for delivering the location of a calling party using a stationary terminal device, according to a preferred embodiment of the present invention.

Referring to FIG. 2a, the primary components of the stationary terminal device embodiment of the present invention include SCP 200 and address database 202. Address database 202 is a part of location-tracking network 201 and contains a location description for the location-tracking network terminal devices (e.g., telephones) organized by directory number. SCP 200 is in communication with address database 202 and is specially programmed to perform location delivery logic. Specifically, in response to a query requesting location information, SCP 200 reads the calling party information embedded in the query, and consults address database 202 for the calling party's location (i.e., the location of the calling party's wireline network terminal). SCP 200 returns routing instructions including the location of the calling party.

Optionally, the query also asks for call name delivery information, in response to which SCP 200 consults name database 114 for the calling party's name and SCP 200 returns the name and telephone number of the calling party along with the location information.

Address database 202 and name database 114 are preferably maintained by location-tracking network 201 as shown in FIG. 2a, whereby network user names and locations are stored upon service activation and SCP 200 is given access to the information.

Alternatively, the network of SCP 200 could maintain address database 202 and name database 114.

Based on the system architecture shown in FIG. 2a, a preferred embodiment of the present invention delivers the location information of a calling party using a stationary terminal device according to the method shown in FIG. 2b. Although this method describes location information delivered in the context of CNAM, the present invention could provide location delivery wholly separate from a CNAM service. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Referring to FIGS. 2a and 2b, in step 260, calling party 101 dials the directory number of a called party 102 (404-555-2222).

Called party 102 is a CNAM subscriber having a display unit 117. In step 262, central office 104 serving calling party 101 obtains routing information, populates an initial address message (IAM) with the directory number of calling party 101 (404-555-1111), the directory number of the called party 102 (404-555-2222), and a presentation parameter (in this example) that allows a CNAM display. In step 264, central office 104 sends this routing information in the signaling message to central office 106, which serves called party 102.

In step 266, the signaling message activates a trigger on central office 106 set for calls to a CNAM and location delivery subscriber (the called party). The trigger launches a query 250 asking for the name and location of the calling party, and including in the called party address parameter the directory number of calling party 101, 404 555-1111. In step 268, central office 106 sends query 250 to STP 108, which performs a global title translation on the called party address parameter and determines that query 250 should be routed to SCP 200. STP 108 then forwards the query 250 to SCP 200 through CCS7 Network 110 in step 270.

In response to query 250, in step 272, SCP 200 searches name database 114 for calling party 101's record, from which SCP 200 retrieves the associated name. SCP 200 also searches address database 202 for calling party 101's record from which SCP 200 5 retrieves calling party 101's location information.

In step 274, SCP 200 returns the name and location associated with the directory number of calling party 101 (along with call routing instructions) in a transaction capability application part (TCAP) response 251 to central office 106 through CCS7 Network 110 and STP 108. In step 276, central office 106 terminates the call to called party 102, sending the name, directory number, and location of calling party 101. Finally, in step 278, the information, including the location of calling party 101, is displayed on called party's display unit 117. Display unit 117 also generates and displays the date and time of the call. Thus, for the wireline call, called party 102 knows the location of calling party 101 before answering the telephone call.

Although called party 102 is depicted as a wireline device in FIG. 2a, one of ordinary skill in the art would appreciate that called party 102 could also be a wireless network user to which SCP 200 delivers location information. In such a case, the system architecture would preferably include a mobile switching center (MSC) between central office 106 and called party 102. The location information originating from SCP 200 would pass through CCS7 Network 110, STP 108, central office 106, the MSC, and onto the called party 202. Also, preferably display unit 117 would be integral to the device of called party 102.

In addition, although calling party 101 is shown as a part of a separate location-tracking network 201 in FIG. 2a, one of ordinary skill in the art would appreciate that calling party 101 could be within the same network as called party 102. In such case, address 12 database 202 and name database 114 would also be within the same network.

Figure 2C:
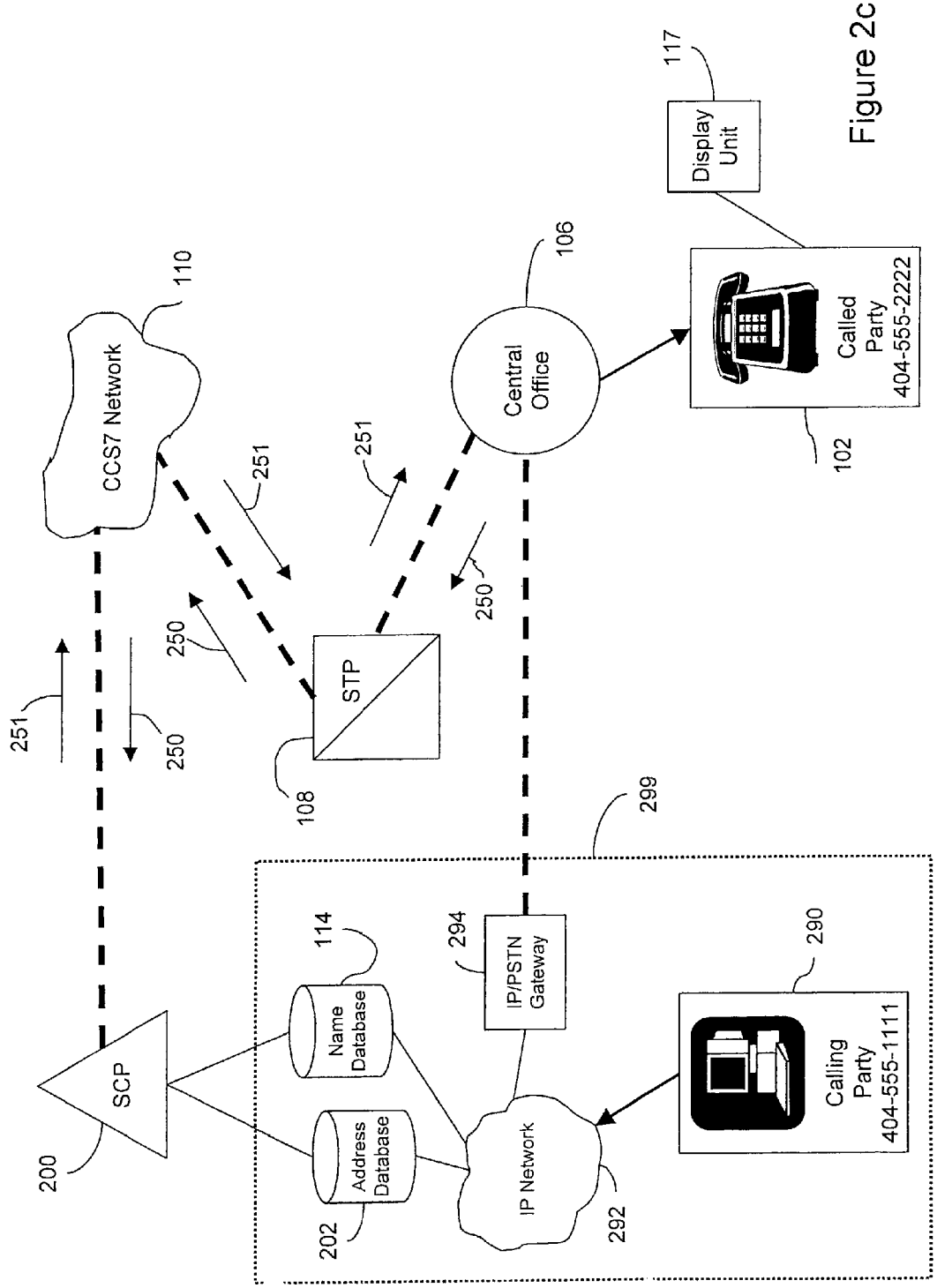
FIG. 2c is a schematic diagram of a system architecture that provides location delivery for calling parties using stationary VoIP terminal devices, according to an alternate preferred embodiment of the present invention.

In an alternate preferred embodiment of the present invention, the calling party is a stationary VoIP telephone, instead of a stationary wireline telephone, and the location-tracking network is an IP network (shown generally as 299). As shown in FIG. 2c, VoIP telephone 290 is in communication with IP network 292. IP network 292 is in communication with name database 114 and address database 202 and maintains the information within the databases. To facilitate calls to and from the circuit-switched PSTN network, IP network 292 is in communication with central office 106 through gateway 294. Gateway 294 handles IP to PSTN conversions. Within this IP/PSTN system architecture, the method for delivering location information is as described above for the stationary wireline telephone, in FIGS. 2a and 2b.

Figure 3A:
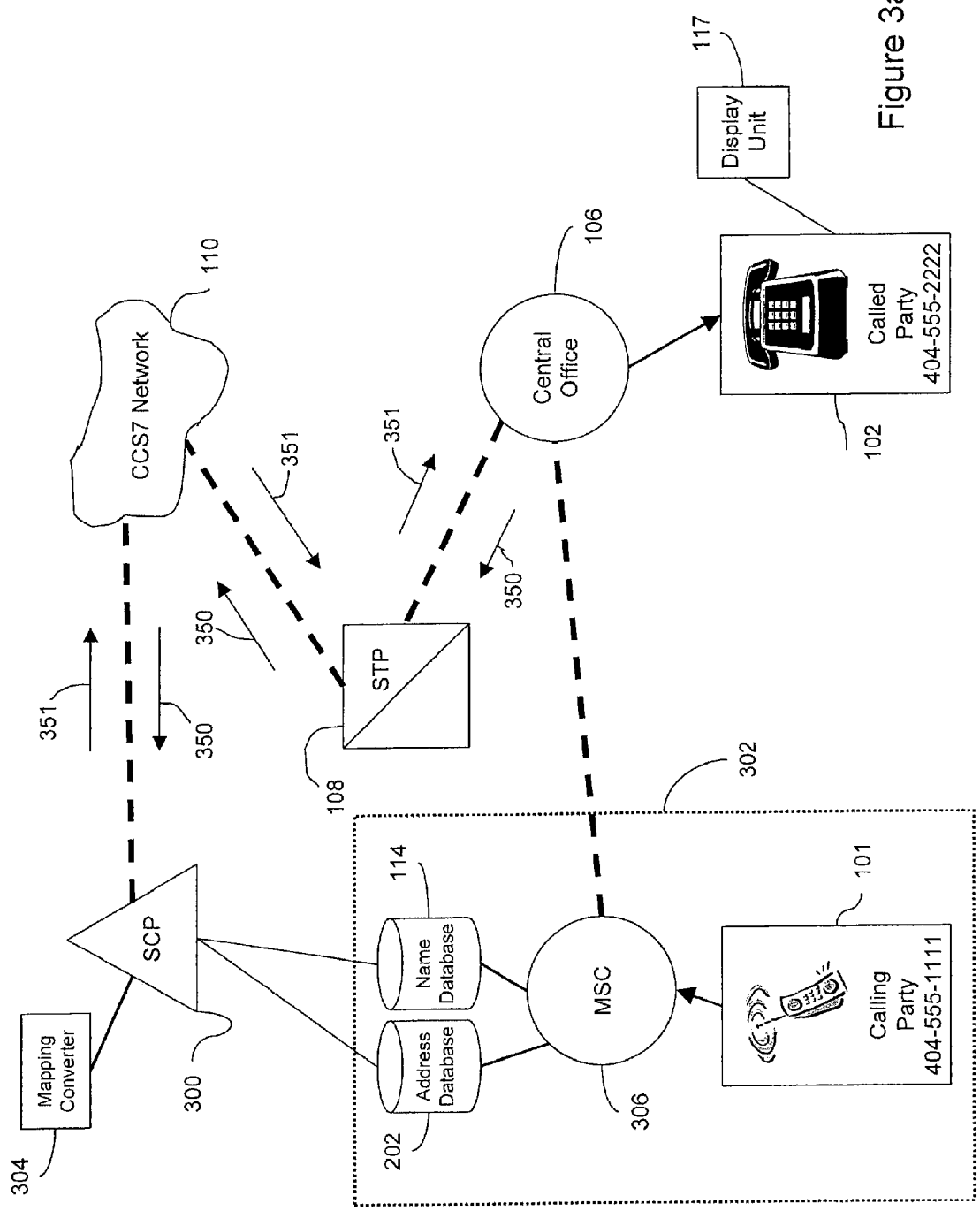
FIG. 3a is a schematic diagram of a system architecture that provides location delivery for calling parties using mobile devices, according to a preferred embodiment of the present invention.
Figure 3B:
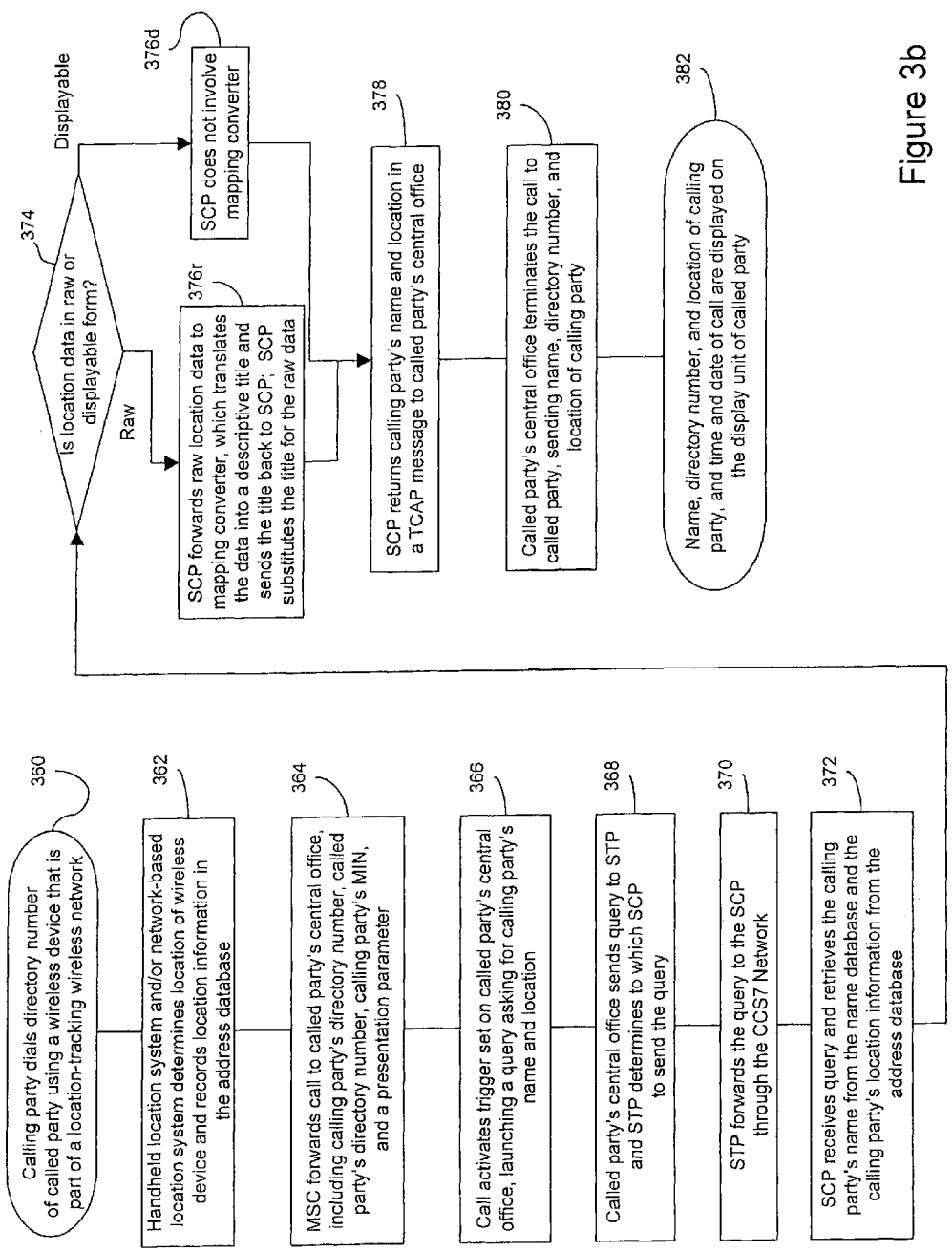
FIG. 3b is a flowchart, corresponding to FIG. 3a, outlining the method steps for delivering the location of a calling party mobile devices, according to a preferred embodiment of the present invention.

FIG. 3a illustrates a system architecture that provides location delivery for calling parties using mobile devices, according to a preferred embodiment of the present invention. As shown, the primary components of the mobile device embodiment of the present invention include SCP 300 and a location-tracking network 302, which in this case is a wireless network. Wireless network 302 tracks the location of wireless network devices, such as cellular telephones and interactive pagers, and records location data in address database 202 as part of each call. The methods by which wireless network 302 determines the location of a mobile wireless network device are described below. Wireless network 302 provides SCP 300 with access to address database 202. SCP 300 is specially programmed to perform location delivery logic. Specifically, in response to a query requesting location and CNAM information, SCP 300 reads the calling party information embedded in the query, which includes the calling party's directory number. Based on the directory number, SCP 300 13 consults name database 114 for calling party 101's name and address database 202 for calling party 101's location information. SCP 300 returns routing instructions including the name, telephone number, and location of the calling party.

If wireless network 302 provides location data in a rudimentary form not easily understood by a CNAM subscriber, the primary components of the wireless embodiment further include a mapping converter 304 in communication with SCP 300, as shown in FIG. 3a. An example of a rudimentary form would be GPS coordinates, with which the typical telephone user is unfamiliar. As used herein, "raw" refers to location data in a rudimentary form, unsuitable for display on a calling name display unit. "Displayable" refers to location data already suitable for display on a display unit. Mapping converter 304 translates the location data provided by wireless network 302 into descriptions that are understandable to the typical user. For example, if wireless network 302 furnishes GPS coordinates, mapping converter 304 could translate coordinates X-Y into "101 Park Place." In this manner, SCP 300 reads the location data provided by wireless network 302, as translated (if necessary) by mapping converter 304, and delivers the location information to display unit 117.

Although FIG. 3a shows mapping converter 304 as a separate component within the PSTN network, one of ordinary skill in the art would understand that the functions and structure of mapping converter 304 could be located in several different places. For example, mapping converter 304 could be located within SCP 300 or within name database 114. As another example, mapping converter 304 could also be located within wireless network 302, in communication with location system or as part of location system.

Regardless of where mapping converter 304 is provisioned, the desired end result is to deliver displayable location information to display unit 117.

14 In tracking the location of network devices, wireless network 302 determines the location of a network device during origination of the call from the calling party, and records the location data in address database 202. To obtain the location data, wireless network 302 uses any suitable location system. Examples of suitable location systems include handheld device location systems and network-based location systems. One example of a handheld device location system is a GPS mounted in a cellular telephone. Examples of network-based location systems include triangulation systems and Wireless Application Protocol (WAP) location systems. Depending on the desired degree of accuracy, one or both of the location systems can be used to determine a device's location.

Suitable WAP location services are described in WAP version 1.1, which is herein incorporated by reference in its entirety. WAP is an application environment and set of communication protocols for wireless devices designed to enable manufacturer-, vendor-, and technology-independent access to the Internet and advanced telephony services. WAP provides wireless Internet access through all digital cellular networks, giving network users a menu driven method for downloading information, such as flight schedules and bank account balances, to wireless devices from the Internet.

The present invention will enjoy widespread application as location-tracking networks continue to emerge. In particular, the present invention will take advantage of location data provided by federally mandated enhanced wireless 911 (E911) services. E911 services help ensure that wireless telephones provide 911 call centers, or Public Safety Answering Points (PSAPs), with vital information necessary to locate and identify a caller in an emergency. To comply with E911 standards promulgated by the Federal Communications Commission (FCC), wireless network providers will soon be required to track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase II requires carriers to provide more precise location information to the PSAP. Thus, the present invention will parlay the location data obtained for the mandated E911 location tracking systems into valuable location information for the benefit of all location delivery and CNAM subscribers.

Based on the system architecture shown in FIG. 3a, a preferred embodiment of the present invention delivers the location information of a wireless calling party according to the method shown in FIG. 3b. Although this method describes location information delivered in the context of CNAM, the present invention could provide location delivery wholly separate from a CNAM service. Referring to FIGS. 3a and 3b, in step 360, calling party 101 dials the directory number of a called party 102 (404-555-2222) using a wireless device that is part of location-tracking wireless network 302. Called party 102 subscribes to location delivery and CNAM and has a display unit 117. In step 362, if wireless network 302 includes a handheld location system, the wireless device of calling party 101 forwards the location information to wireless network 302, which records the location information in address database 202. If wireless network 302 includes a network-based location service, the network-based location system determines the location of the handheld device and records the location information in address database 202.

In step 364, MSC 306 forwards the call to central office 106, which serves called party 102. The call includes the directory number 16 of calling party 101 (404-555-1111), the directory number of the called party 102 (404-555-2222), the mobile identification number of calling party 101, and a presentation parameter that enables a CNAM display.

In step 366, the call activates a trigger on central office 106 set for calls to a location delivery and CNAM subscriber (the called party).

The trigger launches a query 350 asking for the name and location of the calling party, and including in the called party address parameter the directory number of calling party 101, 404-555-1111. In step 368, central office 106 sends query 350 to STP 108, which performs a global title translation on the called party address parameter and determines that query 350 should be routed to SCP 300. STP 108 then forwards query 350 to SCP 300 through CCS7 Network 110 in step 370.

In step 372, in response to query 350's asking for name and location information, SCP 300 searches name database 114 for calling party 101's record (using calling party 101's directory number and/or mobile identification number) from which SCP 300 retrieves the associated name. SCP 300 also searches address database 202 and retrieves the associated location information.

In step 374, SCP 300 determines whether the location data received from wireless network 302 is in raw or displayable form. If the location data received from wireless network 302 is in raw form not easily understood by subscribers (e.g., the location data is GPS coordinates), in step 376r, SCP 300 forwards the location data to mapping converter 304, which translates the location data into a descriptive title corresponding to the raw location data and returns the descriptive title to SCP 300. SCP 300 then substitutes the descriptive title for the raw location data. If the location data is in displayable form, in step 376d, SCP 300 forwards the location data without involving mapping converter 304.

17 Having the location information and the name of calling party 101, SCP 300, in step 378, returns the name and location associated with the directory number of calling party 101 (along with call routing instructions) in a transaction capability application part (TCAP) response 351 to central office 106 through CCS7 Network 110 and STP 108. In step 380, central office 106 terminates the call to called party 102, sending the name, directory number, and location of calling party 101. Finally, in step 382, the information, including the location of calling party 101, is displayed on called party's display unit 117, along with the date and time of the call as generated by display unit 117.

In delivering location information, the present invention is compatible with most conventional CNAM display units. CNAM display units typically have a screen of three to four lines of text displaying 14 characters each, and can accept up to 256 characters in each TCAP message. If a CNAM delivers a calling party's name, directory number, and time and date of the call, as well as the location information of the present invention, the CNAM display unit preferably contains a screen of four lines to accommodate these four items of information. If the CNAM display unit contains only three lines, preferably the unit provides means for scrolling through the text. In either case, because conventional CNAM display units accommodate a TCAP message containing as many as 256 characters, the units have existing capacity with which to display location information. Thus, the present invention carries the advantage of not requiring the procurement of additional hardware, i.e., display units.

In an alternate preferred embodiment of the present invention, calling party 101 and called party 102 are wireless device users, both associated with the same wireless network or different wireless networks. In this embodiment, for a wireless to wireless call between calling party 101 and called party 102, the method and system of 18 location delivery occurs as outlined above, except that wireless components are used in the system architecture and wireless protocols (e.g., Wireless Intelligent Network (WIN)) are used instead of wireline protocols (e.g., AIN).

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing geographic location of a calling party on a voice over internet protocol phone, comprising:
   receiving a call transmitted from a calling party internet protocol network to a called party;
   in response to receiving the call, obtaining geographic location information of the calling party;
   translating the geographic location information from raw form to a displayable form; and
   delivering the geographic location information to the called party;
   wherein the geographic location information includes a structure name.

2. The method of claim 1, wherein when the call is from a stationary geographic location, the geographic location information is recorded during the calling party service activation.

3. The method of claim 1, wherein when the call is from a mobile device, the geographic location information is recorded after the call originates from the calling party and before the call is received at a network element associated with the called party.

4. The method of claim 3, wherein the network element associated with the called party is a central office associated with the called party.

5. The method of claim 3, wherein the geographic location information is recorded using a geographic location system to determine a current geographic location of the mobile device.

6. The method of claim 1, wherein the geographic location information is received in response to searching a database for the calling party geographic location information using the internet protocol address of the calling party.

7. The method of claim 1, wherein the geographic location information is global positioning system coordinates.

8. The method of claim 1, wherein delivering the geographic location information to the called party uses a medium of an audio message.

9. The method of claim 1, wherein when the call is from a mobile device, the internet protocol network is configured to track geographic locations of mobile device; and
   wherein the internet protocol network is configured to provide the geographic location information.

10. The method of claim 1, wherein the internet protocol network provides enhanced 911 services.

11. The method of claim 1, wherein the structure name is a name of a building.

12. A system for delivering location information of a calling party, the system comprising:
    a network configured to receive a call transmitted from the calling party to a called party and configured to obtain geographic location information of the calling party;
    a mapping converter configured to translate the geographic location information from raw form to displayable form; and
    the network configured to deliver the geographic location information to the called party;
    wherein the geographic location information includes a structure name.

13. The system of claim 12, wherein the network is configured to query a database to obtain the geographic location information; and
    wherein the network is configured to provide the geographic location information to a called party network element.

14. The system of claim 12, wherein the network is an internet protocol network.

15. The system of claim 12, wherein the network is configured to receive the call from a voice over internet protocol phone of the calling party.

16. The system of claim 12, wherein when the call is from a stationary geographic location, the geographic location information is recorded during the calling party service activation.

17. The system of claim 12, wherein when the call is from a mobile device, the geographic location information is recorded after the call originates from the calling party and before the call is received at a network element associated with a called party.

18. A method for delivering location information of a calling party, comprising:
    receiving a call transmitted from the calling party to a called party;
    in response to receiving the call, obtaining geographic location information of the calling party; and
    delivering the geographic location information to the called party;
    wherein the geographic location information includes a structure name.

19. The method of claim 18, wherein the structure name is a name of a building.

20. The method of claim 18, further comprising translating the geographic location information from raw form to a displayable form.

* * * * *